US011979702B2

(12) United States Patent

Sui et al.

(10) Patent No.: US 11,979,702 B2
(45) Date of Patent: May 7, 2024

(54) EARPHONE BOX AND EARPHONE

(71) Applicant: BEIJING XIAOMI MOBILE SOFTWARE CO., LTD., Beijing (CN)

(72) Inventors: Liguo Sui, Beijing (CN); Chao Liu, Beijing (CN)

(73) Assignee: Beijing Xiaomi Mobile Software Co., Ltd., Beijing (CN)

( * ) Notice: Subject to any disclaimer, the term of this patent is extended or adjusted under 35 U.S.C. 154(b) by 226 days.

(21) Appl. No.: 17/681,397

(22) Filed: Feb. 25, 2022

(65) Prior Publication Data

US 2023/0074689 A1 Mar. 9, 2023

(30) Foreign Application Priority Data

Sep. 7, 2021 (CN) ......................... 202111045769.1

(51) Int. Cl.

| | |
|---|---|
| ***H04R 25/00*** | (2006.01) |
| ***H01F 7/02*** | (2006.01) |
| ***H04R 1/10*** | (2006.01) |

(52) U.S. Cl.

CPC ......... *H04R 1/1016* (2013.01); *H01F 7/0252* (2013.01); *H04R 1/1058* (2013.01); *H04R 1/1025* (2013.01)

(58) Field of Classification Search

CPC .. H04R 1/1041; H04R 1/1025; H04R 1/1016; H04R 1/1091; H04R 2420/07

See application file for complete search history.

(56) References Cited

U.S. PATENT DOCUMENTS

| | | | | |
|---|---|---|---|---|
| 9,769,558 | B2 * | 9/2017 | Chandramohan .... | A45C 13/005 |
| 2020/0107100 | A1 | 4/2020 | Stanley et al. | |
| 2020/0233046 | A1 | 7/2020 | Ding et al. | |

FOREIGN PATENT DOCUMENTS

| | | | |
|---|---|---|---|
| CN | 107809696 | B | 12/2019 |
| CN | 211860506 | U | 11/2020 |
| CN | 213152320 | U | 5/2021 |

OTHER PUBLICATIONS

"Memory Foam Tips for AirPods Pro 1 & 2 , V3.0, No Silicone Eartips Pain, Anti-Slip Replacement Ear Tips, Fit in the Charging Case, Reducing Noise Earbuds, 3 Pairs (Assorted Sizes S/M/L, Black)" Jan. 4, 2021 https://www.amazon.com/Silicone-Anti-Slip-Replacement-Charging-Reducing/dp/B08RYM4XMC?th=1.*

Extended EP Search Report issued to EP Application No. 22158880.9 dated Aug. 31, 2022, (10p).

* cited by examiner

*Primary Examiner* — Amir H Etesam

(74) *Attorney, Agent, or Firm* — Arch & Lake LLP

(57) ABSTRACT

An earphone box includes a box body and a box magnet. The box body defines an accommodating groove configured to accommodate the earphone, and the accommodating groove is provided with an interface configured to be electrically coupled to the earphone. The box magnet is mounted on the box body and configured as a multipole magnet, the earphone is provided with an earphone magnet with the same number of poles as the box magnet, and the earphone magnet attracts and couples with the box magnet.

17 Claims, 4 Drawing Sheets

EARPHONE BOX AND EARPHONE

CROSS-REFERENCE TO RELATED APPLICATION

This application is based on and claims priority to the Chinese Patent Application No. 202111045769.1 filed on Sep. 7, 2021, the entire content of which is incorporated herein as reference for all purposes.

TECHNICAL FIELD

The present disclosure relates to the field of earphone box technologies, and more particularly, to an earphone box and an earphone.

BACKGROUND

Existing TWS (true wireless stereo) earphones are mainly classified into two types: i.e., earphones with a bud shape and earphones with a stem shape. The earphone is in contact with and compresses a pogopin (may be referred as pogo pin) in an earphone box by a copper column on the earphone when it is placed into the earphone box, to realize a charging process to the earphone by the earphone box. In order to ensure that the copper column of the earphone are in full contact with the pogopin of the earphone box to realize the charging of the earphone when the earphone is placed into the earphone box, it is typically implemented by the following ways: an inner housing of the earphone box has a shape similar to a shape of the earphone; a position of the earphone in the earphone box is restricted by the shape; moreover, in order to ensure the charging reliability of the placed earphone, the copper column of the earphone and the pogopin of the earphone charging box are both oriented along a vertical direction, which is consistent with the gravity direction of the earphone, to reduce a mutual dislocation between the copper column and the pogopin caused by the gravity component.

SUMMARY

An earphone box according to the present disclosure includes a box body and a box magnet. The box body defines an accommodating groove for accommodating the earphone, and the accommodating groove is provided with an interface electrically coupled to the earphone. The box magnet is mounted on the box body and configured as a multipole magnet, the earphone is provided with an earphone magnet with the same number of poles as the box magnet, and the box magnet is configured to attract and couple with the earphone magnet. The attraction coupling face of the box magnet is an inclined face.

An earphone according to the present disclosure includes an earphone body configured as a bud shape, and the earphone body is adapted to fit in an accommodating groove of an earphone box. The earphone box includes a box body and a box magnet. The box body defines an accommodating groove for accommodating the earphone, and the accommodating groove is provided with an interface electrically coupled to the earphone. The box magnet is mounted on the box body and configured as a multipole magnet, the earphone is provided with an earphone magnet with the same number of poles as the box magnet, and the box magnet is configured to attract and couple with the earphone magnet. The attraction coupling face of the box magnet is an inclined face.

DETAILED DESCRIPTION

Figure 1:
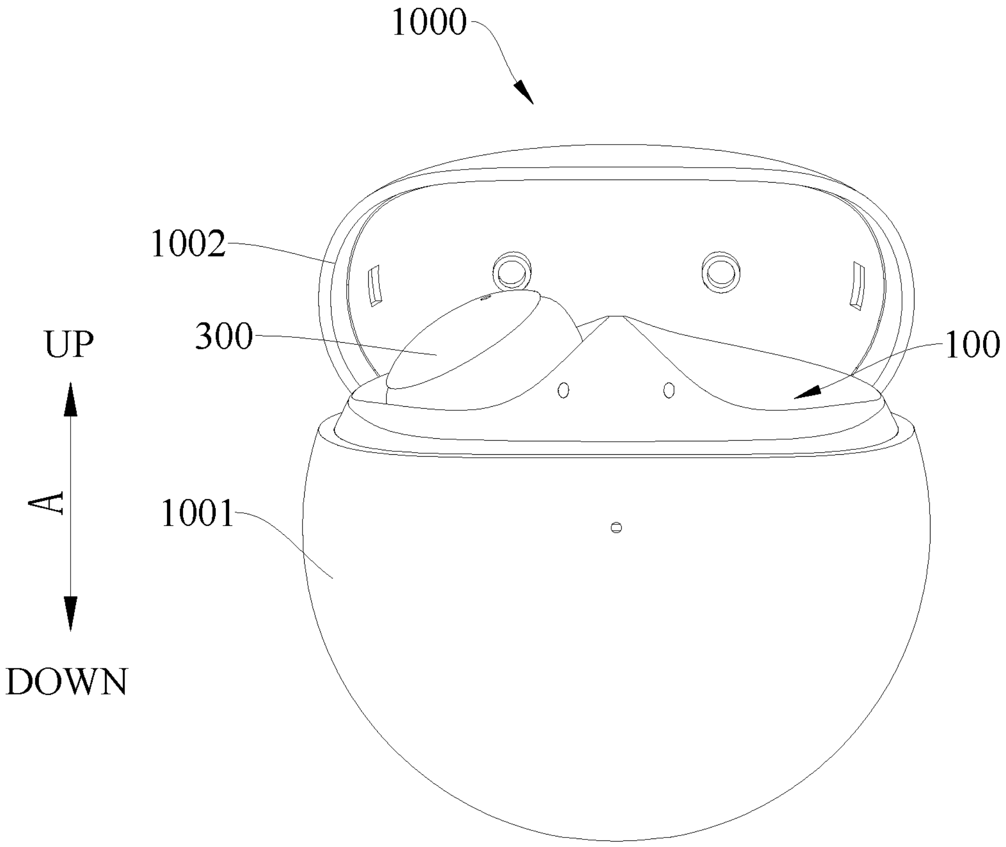
FIG. 1 is a front view of an earphone box according to one or more examples of the present disclosure.

Embodiments of the present disclosure are described in detail below, and examples of the described embodiments are illustrated in accompanying drawings. The following embodiments described with reference to the accompanying drawings are exemplary and are intended to explain the present disclosure, rather than limit the present disclosure.

An earphone box 1000 according to examples of the present disclosure is described below with reference to the accompanying drawings.

As illustrated in FIGS. 1 to 4, the earphone box 1000 according to the examples of the present disclosure includes a box body 1001 and a box magnet 200.

The box body 1001 defines an accommodating groove 100 for accommodating an earphone 300, and the accommodating groove 100 is provided with an interface 130 electrically coupled to the earphone 300.

The box magnet 200 is mounted on the box body 1001, and is configured as a multipole magnet. The box magnet 200 is a planar multipole magnet, i.e., an attraction face of the box magnet 200 has at least one pair of poles (one N pole and one S pole). The earphone 300 is provided with an earphone magnet 310 with the same number of poles as the box magnet 200. Therefore, an attraction face of the earphone magnet 310 also has at least one pair of poles. Moreover, a number of poles of the earphone magnet 310 and a number of poles of the box magnet 200 are the same. That is, when the box magnet 200 is a four-pole magnet, the earphone magnet 310 is also a four-pole magnet; when the box magnet 200 is a two-pole magnet, the earphone magnet 310 is also a two-pole magnet. The earphone magnet 310 attracts and couples with the box magnet 200, so that the earphone 300 can be fixed in the accommodating groove 100 and arranged obliquely relative to the box body 1001.

An earphone box in the related art has following disadvantages: a low utilization rate of an internal space, a large overall volume and the inconvenient carrying, and the earphone is inconvenient to take out of the earphone box.

In the earphone box 1000 according to the examples of the present disclosure, since the box body 1001 is provided with the box magnet 200 configured as the multipole magnet and the earphone 300 is provided with the earphone magnet 310 with the same number of poles as the box magnet 200, the attraction face of the box magnet 200 has at least one pair of poles, and the attraction face of the earphone magnet 310 also has at least one pair of poles. Moreover, the earphone magnet 310 attracts and couples with the box magnet 200, so that a plurality of poles on the attraction face of the earphone magnet 310 and a plurality of poles on the attraction face of the box magnet 200 can attract each other together in one-to-one correspondence, to realize a multipoint positioning (at least two-point positioning) of the earphone 300 and the accommodating groove 100, so that the positioning effect between the earphone magnet 310 and the box magnet 200 is good. Moreover, the earphone magnet 310 and the box magnet 200 are the multipole magnet, to increase an attraction force between the earphone magnet 310 and the box magnet 200, so that the positioning effect between the earphone magnet 310 and the box magnet 200 is further improved.

The box magnet 200 is mounted on the box body 1001, and the earphone magnet 310 is arranged on the earphone 300. Therefore, the positioning between the earphone 300 and box body 1001 changes from the traditional single-point positioning to the multi-point positioning (at least two-point positioning) through a multi-point attraction cooperation between the earphone magnet 310 and the box magnet 200, thus increasing the positioning effect between the earphone 300 and the box body 1001, so that the earphone 300 is more stable and not easy to change its position when it is attracted on the box body 1001. Thus, the earphone 300 is more stable when charging in the box body 1001, and the charging effect is good.

The good positioning effect between the earphone 300 and the box body 1001 can avoid the charging instability of the earphone 300 caused by the gravity. Thus, a placement mode of the earphone 300 does not have to be limited to a mode of a horizontal placement and a mode of a vertical placement, so that the earphone 300 can be fixed in the accommodating groove 100 conveniently and arranged obliquely relative to the box body 1001. Since the earphone has a generally strip structure, the mode of the horizontal placement will waste more space and increase a length of the box body, the mode of the vertical placement will also waste more space and increase a height of the box body. The increase in each of the length, a width and the height of the box body will increase a volume of the box body. However, when the earphone 300 is arranged obliquely relative to the box body 1001, a space of the box body 1001 can be fully used, i.e., the space utilization rate of the box body 1001 is improved, to reduce the length or the height of the box body 1001, which is conducive to reducing the volume of the box body 1001, i.e., a volume of the earphone box 1000 becomes small and easy to carry.

Therefore, the earphone box 1000 according to the examples of the present disclosure has the advantages of the good positioning effect, the stable charging, the small volume and the good portability.

Figure 2:
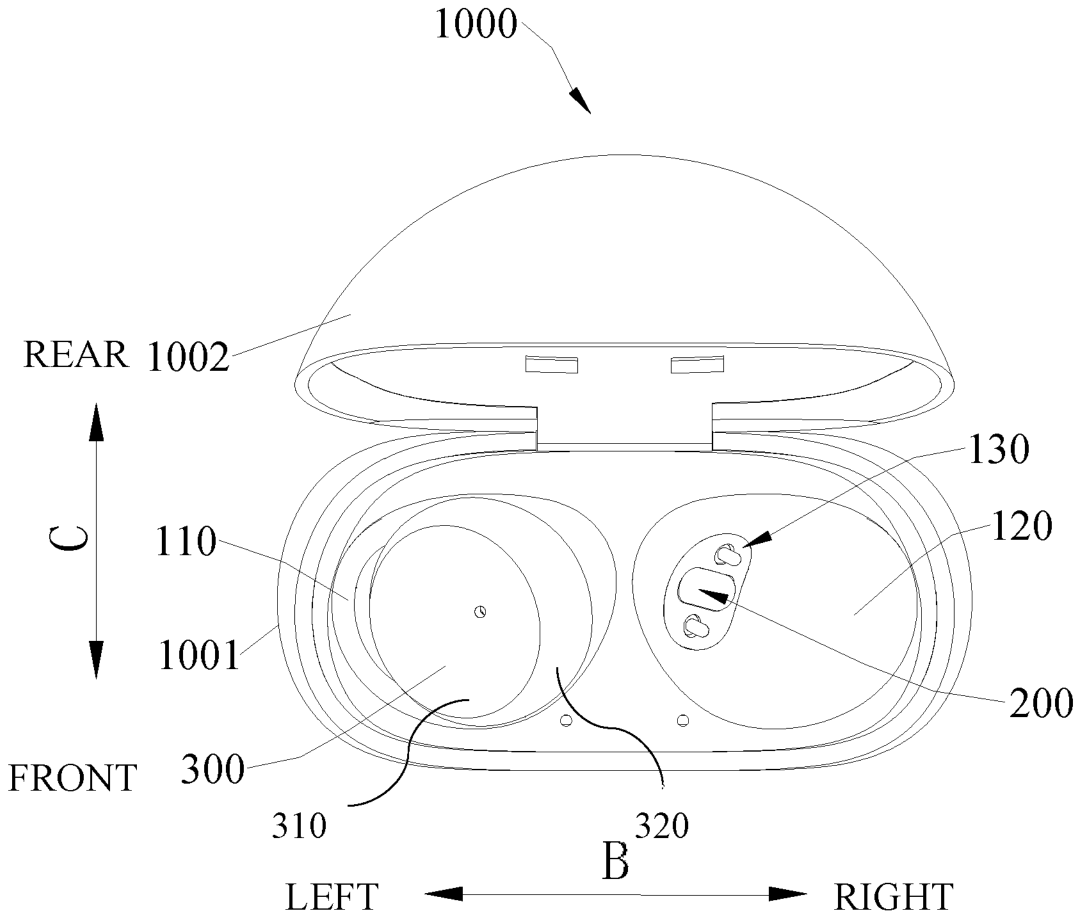
FIG. 2 is a top view of an earphone box according to one or more examples of the present disclosure.

For convenience of understanding, an up-down direction of the earphone box 1000 according to the examples of the present disclosure is illustrated by an arrow Ain FIG. 1, an left-right direction of the earphone box 1000 according to the examples of the present disclosure is illustrated by an arrow B in FIG. 2, and a front-rear direction of the earphone box 1000 according to the examples of the present disclosure is illustrated by an arrow C in FIG. 2.

As illustrated in FIGS. 1 to 4, the earphone box 1000 according to the examples of the present disclosure includes the box body 1001, the box cover 1002 and the box magnet 200.

As illustrated in FIG. 1, the box body 1001 defines the accommodating groove 100 for accommodating the earphone 300, and the accommodating groove 100 is provided with the interface 130 electrically coupled to the earphone 300. That is, the earphone 300 can be placed in the accommodating groove 100 and electrically coupled to the interface 130, to charge the earphone 300.

The box cover 1002 is pivotally coupled to the box body 1001, to open and close the accommodating groove 100. That is, the box cover 1002 and the box body 1001 can rotate with each other. For example, the box body 1001 is located below the box cover 1002 in the up-down direction. A rear end of the box body 1001 is coupled to a rear end of the box cover 1002. Therefore, when a front end of the box cover 1002 rotates upward around a joint between the box cover 1002 and the box body 1001, the accommodating groove 100 can be opened and the earphone 300 can be put in or taken out. When the front end of the box cover 1002 rotates downward around the joint between the box cover 1002 and the box body 1001, the accommodating groove 100 can be closed.

The box magnet 200 is mounted on the box body 1001, and is configured as the multipole magnet. The earphone 300 is provided with the earphone magnet 310 with the same number of poles as the box magnet 200. Thus, the earphone 300 can be fixed on the box body 1001 by the multi-point positioning conveniently.

In some examples, each of the box magnet 200 and the earphone magnet 310 is the two-pole magnet. The two-pole magnet has a small volume, is convenient to mount and reduces the volume of the box body 1001. Moreover, the two-point positioning between the box magnet 200 and the earphone magnet 310 can be realized by the two-pole magnet, to improve the positioning effect between the earphone 300 and the box body 1001. In some examples, two poles on the attraction face of the earphone magnet 310 of the two-pole magnet and two poles on the attraction face of the box magnet 200 of the two-pole magnet can attract each other together correspondingly, to realize the two-point positioning effect, so that the positioning effect between the earphone magnet 310 and the box magnet 200 is good. Moreover, the earphone magnet 310 and the box magnet 200 are the two-pole magnets, to increase the attraction force between the earphone magnet 310 and the box magnet 200, so that the positioning effect between the earphone magnet 310 and the box magnet 200 is further improved. That is, the positioning effect between the earphone 300 and the box body 1001 is improved, so that the earphone 300 is more stable and not easy to change its position when it is attracted on the box body 1001. Thus, the earphone 300 is more stable when charging in the box body 1001, and the charging effect is good.

The earphone magnet 310 of the two-pole magnet and the box magnet 200 of the two-pole magnet have a strong attraction force and a good positioning effect, so that the movement and the charging instability of the earphone 300 caused by the gravity can be avoided. Thus the placement mode of the earphone 300 does not have to be limited to the mode of the horizontal placement and the mode of the vertical placement, so that the earphone 300 can be fixed in the accommodating groove 100 conveniently and arranged obliquely relative to the box body 1001.

In some examples, the accommodating groove 100 includes a left accommodating groove 110 for accommodating a left earphone and a right accommodating groove 120 for accommodating a right earphone. In some examples, the left accommodating groove 110 is located at a left portion of the box body 1001, and the right accommodating groove 120 is located at a right portion of the box body 1001. The left accommodating groove 110 and the right accommodating groove 120 are arranged symmetrically in a mirrored manner in the left-right direction, to effectively use the space of the box body 1001, improve the space utilization rate of the box body 1001, which is conducive to reducing the volume of the box body 1001, so that the earphone box 1000 has a small volume and is easy to carry.

Figure 3:
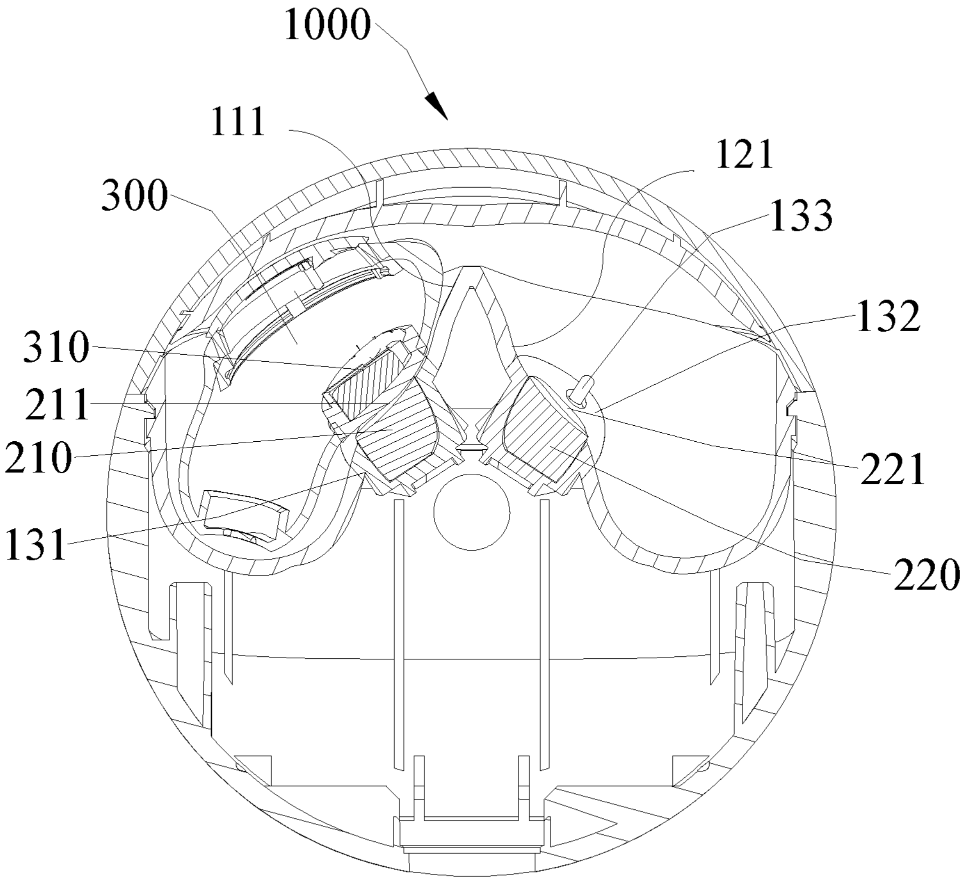
FIG. 3 is a sectional view of an earphone box according to one or more examples of the present disclosure.

As illustrated in FIG. 2 and FIG. 3, in some examples, the box magnet 200 includes a first box magnet 210 and a second box magnet 220 arranged in the box body 1001. At least part of the first box magnet 210 is exposed in the left accommodating groove 110, and at least part of the second box magnet 220 is exposed in the right accommodating groove 120. An exposed face (an attraction face) of the at least part of the first box magnet 210 has a plurality of poles, and an exposed face (the attraction face) of the at least part of the second box magnet 220 has a plurality of poles.

The exposed face of the first box magnet 210 can directly attract the earphone magnet 310 of the left earphone in the left accommodating groove 110 and has a plurality of positioning points (at least two), and the first box magnet 210 can be in direct contact with the earphone magnet 310 of the left earphone in the left accommodating groove 110 without a barrier layer, so that the attraction effect between the first box magnet 210 and the earphone magnet 310 of the left earphone in the left accommodating groove 110 can be improved. That is, the left earphone is fixed more stably, and the charging is stable.

Similarly, the exposed face of the second box magnet 220 can directly attract the earphone magnet 310 of the right earphone in the right accommodating groove 120 and has a plurality of positioning points (at least two), and the second box magnet 220 can be in direct contact with the earphone magnet 310 of the right earphone in the right accommodating groove 120 without the barrier layer, so that the attraction effect between the second box magnet 220 and the right earphone in the right accommodating groove 120 is improved. That is, the right earphone is fixed more stably, and the charging is stable.

As illustrated in FIG. 3, in some examples, the box body 1001 includes a first inclined face 111 constituting at least part of a side wall of the left accommodating groove 110 and a second inclined face 121 constituting at least part of a side wall of the right accommodating groove 120. The first inclined face 111 can allow the left earphone to be placed obliquely in the left accommodating groove 110, and the second inclined face 121 can allow the right earphone to be placed obliquely in the right accommodating groove 120, to improve the utilization rate of the space of the box body 1001, which is conducive to reducing the volume of the box body 1001, so that box body 1001 is easy to carry.

The first box magnet 210 is arranged on the first inclined face 111 with an outer surface 211 of the first box magnet 210 being flush with the first inclined face 111. That is, the outer surface 211 (the attraction face) of the first box magnet 210 and the first inclined face 111 are on the same plane, so that the left earphone can be placed and positioned in the left accommodating groove 110 conveniently. The second box magnet 220 is arranged on the second inclined face 121 with an outer surface 221 of the second box magnet 220 being flush with the second inclined face 121. That is, the outer surface 221 (the attraction face) of the second box magnet 220 and the second inclined face 121 are on the same plane, so that the right earphone can be placed and positioned in the right accommodating groove 120 conveniently.

In some examples, a polarity distribution of the outer surface 211 of the first box magnet 210 is different from a polarity distribution of the outer surface 221 of the second box magnet 220. For example, when an upper portion of the outer surface 211 of the first box magnet 210 is N pole and an lower portion thereof is S pole, an upper portion of the outer surface 221 of the second box magnet 220 is S pole and an lower portion thereof is N pole, or, when a left portion of the outer surface 211 of the first box magnet 210 is N pole and a right portion thereof is S pole, a left portion of the outer surface 221 of the second box magnet 220 is S pole and a right portion thereof is N pole. Thus, it is difficult to place the left earphone in the right accommodating groove 120 or to place the right earphone in the left accommodating groove 110, to facilitate the correct positioning and the placement of the left earphone and the right earphone.

As illustrated in FIG. 2 and FIG. 3, in some examples, the interface 130 includes a left interface 131 arranged in the left accommodating groove 110 and a right interface 132 arranged in the right accommodating groove 120. The left interface 131 may be electrically coupled to the left earphone, to charge the left earphone, and the right interface 132 may be electrically coupled to the right earphone, to charge the right earphone.

An axis of the left interface 131 and an axis of the right interface 132 are arranged obliquely. That is, the axis of the left interface 131 can be arranged obliquely relative to the up-down direction. For example, the axis of the left interface 131 can be substantially perpendicular to the first inclined face 111, to facilitate an electrical coupling between the left earphone and the left interface 131, i.e., to facilitate the left interface 131 to stably charge the left earphone. The axis of the right interface 132 can be arranged obliquely relative to the up-down direction, and the axis of the right interface 132 can be substantially perpendicular to the second inclined face 121, to facilitate an electrical coupling between the right earphone and the right interface 132, i.e., to facilitate the right interface 132 to stably charge the right earphone.

In some examples, an included angle between the axis of each of the left interface 131 and the right interface 132 and a horizontal plane is 45°-55°. In this angle range, the box body 1001 has a smaller volume and is easy to carry while facilitating the left interface 131/the right interface 132 to stably charge the left earphone/the right earphone.

As illustrated in FIG. 2 and FIG. 3, in some examples, the left interface 131 is arranged on the first inclined face 111 and adjacent to the first box magnet 210. Therefore, after the left earphone enters into the left accommodating groove 110, it can be electrically coupled to the left interface 131 conveniently. Moreover, a position between the first box magnet 210 of the left earphone and the earphone magnet 310 of the left earphone has a strong attraction force, thus realizing the good positioning effect. The left interface 131 is adjacent to the first box magnet 210, so that the left earphone and the left interface 131 are coupled stably, i.e., the charging of the left earphone is more stable.

The right interface 132 is arranged on the second inclined face 121 and adjacent to the second box magnet 220. Therefore, after the right earphone enters into the right accommodating groove 120, it can be electrically coupled to the right interface 132 conveniently. Moreover, a position between the second box magnet 220 of the right earphone and the earphone magnet 310 of the right earphone has a strong attraction force, thus realizing the good positioning effect. The right interface 132 is adjacent to the second box magnet 220, so that the right earphone and the right interface 132 are coupled stably, i.e., the charging of the right earphone is more stable.

As illustrated in FIG. 2 and FIG. 3, in some examples, each of the left interface 131 and the right interface 132 is a pogopin, and the left earphone and the right earphone are each provided with a coupling copper column for abutting with a spring pin 133 of pogopin. For example, in each of the left interface 131 and the right interface 132, two spring pins 133 of pogopin are provided, and located at two sides of the box magnet 200. That is, the left interface 131 includes two spring pins 133 of pogopin, and the two spring pins 133 of pogopin of the left interface 131 are located at two opposite sides of the first box magnet 210; and the right interface 132 includes two spring pins 133 of pogopin, and the two spring pins 133 of pogopin of the right interface 132 are located at two opposite sides of the second box magnet 220. When the left earphone is placed in the left accommodating groove 110, the coupling copper columns of the left earphone press the spring pins 133 of the left interface 131, to create the electrical coupling between the left earphone and the left interface 131, so that the charging of the left earphone is stable. When the right earphone is placed in the right accommodating groove 120, the coupling copper columns of the right earphone press the spring pins 133 of the right interface 132, to create the electrical coupling between the right earphone and the right interface 132, so that the charging of the right earphone is stable.

In some examples, each of the first inclined face 111 and the second inclined face 121 is a frosted face. Therefore, when the left earphone is placed on the first inclined face 111, a friction is large, so that the left earphone is not easy to move and the positioning effect is good. When the right earphone is placed on the second inclined face 121, a friction is large, so that the right earphone is not easy to move and the positioning effect is good. The first box magnet 210 and the left interface 131 are arranged on the first inclined face 111 with the frosted face, so that the left earphone can be fixed and electrically coupled only by contacting the first inclined face 111. Thus, the left earphone can be arranged obliquely, maximizing utilization rate of the space of the box body 1001 and reducing the volume of the box body 1001. Moreover, the left accommodating groove 110 does not have to make profiling limit, and can realize the reliability of charging under different shapes of different specifications of ear caps. The second box magnet 220 and the right interface 132 are arranged on the second inclined face 121 with the frosted face, so that the right earphone can be fixed and electrically coupled only by contacting the second inclined face 121. Thus, the right earphone can be arranged obliquely, maximizing utilization rate of the space of the box body 1001 and reducing the volume of the box body 1001. Moreover, the right accommodating groove 120 does not have to make profiling limit, and can realize the reliability of charging under different shapes of different specifications of ear caps.

As illustrated in FIG. 3, in some examples, the first inclined face 111 is inclined towards the right accommodating groove 120, so that the left earphone accommodated in the left accommodating groove 110 faces towards the right accommodating groove 120. The second inclined face 121 is inclined towards the left accommodating groove 110, so that the right earphone accommodated in the right accommodating groove 120 is inclined towards the left accommodating groove 110. Thus, positions of the first box magnet 210 and the left interface 131 and positions of the second box magnet 220 and the right interface 132 are close, and all accommodated in a space, to make full use of the space of the box body 1001 and reduce the volume of the box body 1001.

Figure 4:
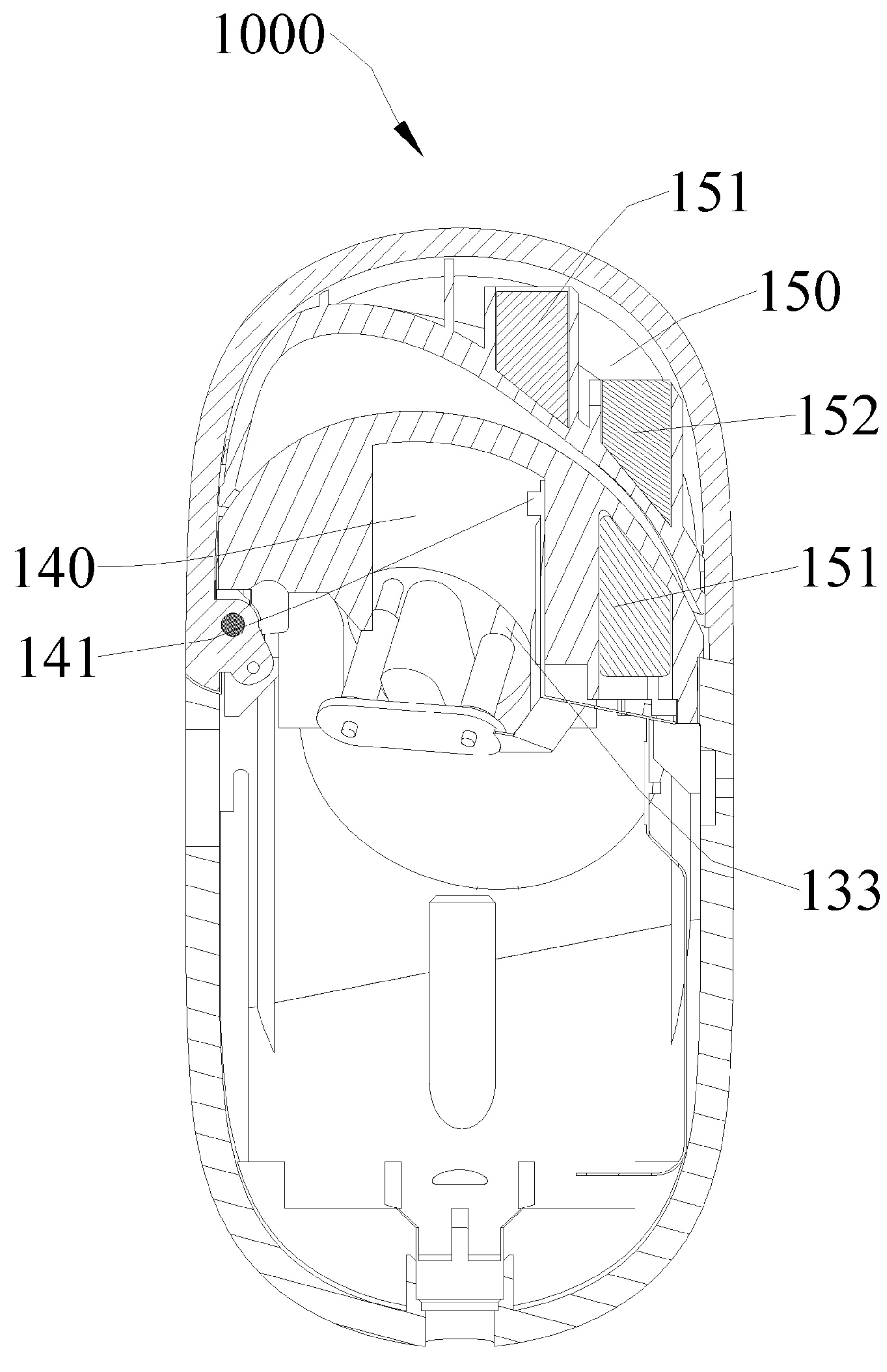
FIG. 4 is another sectional view of an earphone box according to one or more examples of the present disclosure.

As illustrated in FIG. 3 and FIG. 4, in some examples, the box body 1001 further includes a lower mounting cavity 140 spaced apart from the accommodating groove 100, the box cover 1002 defines an upper mounting cavity 150, the lower mounting cavity 140 is provided with a Hall sensor 141, and the upper mounting cavity 150 is provided with a Hall magnet 151. In some examples, the lower mounting cavity 140 is located below the accommodating groove 100, and the upper mounting cavity 150 is located above the accommodating groove 100. The Hall sensor 141 in the lower mounting cavity 140 can cooperate with the Hall magnet 151 in the upper mounting cavity 150 using the Hall effect. When the box cover 1002 is opened, i.e., when the accommodating groove 100 is opened, the Hall sensor 141 detects information and sends the information to the earphone 300, so that a Bluetooth of the earphone 300 is turned on and the earphone 300 is automatically paired with the mobile phone.

In some examples, the upper mounting cavity 150 is provided with a first attraction magnet 152, the lower mounting cavity 140 is provided with a second attraction magnet 142, and the second attraction magnet 142 is configured to attract and couple with the first attraction magnet 152 when the box cover 1002 closes the accommodating groove. Thus, when the box cover 1002 is closed, a coupling between the box body 1001 and the box cover 1002 is strengthened, thus preventing the box cover 1002 from being opened by mistake and preventing the earphone 300 from being lost.

The earphone 300 according to the examples of the present disclosure includes an earphone body 310 configured as a bud shape, and the earphone body 310 is adapted to fit in the accommodating groove 100 of the earphone box 1000 according to any one of the above examples.

The earphone 300 according to the examples of the present disclosure can be obliquely placed in the accommodating groove 100 in the earphone box 1000, has a good positioning effect and can be charged stably. Moreover, after the earphone 300 is placed in the accommodating groove 100, the overall volume is small and the earphone 300 is easy to carry.

In some examples, the earphone 300 further includes a plurality of earphone sleeves 320 of different specifications. Each of the plurality of earphone sleeves 320 is adapted to be fitted over the earphone body 310, and the earphone body 310 fitted with any earphone sleeve 320 can fit in the accommodating groove 100.

That is, a space of the accommodating groove 100 is larger than a total volume of the earphone body 310 and the earphone sleeve 320 fitted over a side of the earphone body 310. The earphone 300 can be put into the accommodating groove 100 for charging and storage without removing the earphone sleeve 320. The earphone box 1000 has a strong adaptability.

In the description of the present disclosure, it shall be understood that terms such as "central," "longitudinal," "transverse," "length," "width," "thickness," "upper," "lower," "front," "rear," "left," "right," "vertical," "horizontal," "top," "bottom," "inner," "outer," "clockwise," "counterclockwise," "axial," "radial" and "circumferential" should be construed to refer to the orientation as then described or as illustrated in the drawings under discussion. These relative terms are for convenience of description and do not indicate or imply that the device or element referred to must have a particular orientation, or be constructed and operated in a particular orientation. Thus, these terms shall not be construed as limitation on the present disclosure.

Terms used in the present disclosure are merely for describing specific examples and are not intended to limit the present disclosure. The singular forms "one", "the", and "this" used in the present disclosure and the appended claims are also intended to include a multiple form, unless other meanings are clearly represented in the context. It should also be understood that the term "and/or" used in the present disclosure refers to any or all of possible combinations including one or more associated listed items.

In addition, terms such as "first" and "second" are merely used for descriptive purposes and cannot be understood as indicating or implying relative importance or the number of technical features indicated. Thus, the features associated with "first" and "second" may explicitly or implicitly include at least one of the features. In the description of the present disclosure, unless otherwise specifically defined, "a plurality of" means at least two, such as two, three, etc.

In the present disclosure, unless otherwise explicitly specified and defined, the terms "mounted," "connected," "coupled," "fixed" and the like are used broadly, and may be, for example, fixed couplings, detachable couplings, or integral couplings; may also be mechanical or electrical couplings or intercommunication; may also be direct couplings or indirect couplings via intervening structures; may also be inner communications or interactions of two elements, which can be understood by those skilled in the art according to specific situations.

In the present disclosure, unless otherwise explicitly specified and defined, a structure in which a first feature is "on" or "below" a second feature may include an example in which the first feature is in direct contact with the second feature, and may also include an example in which the first feature and the second feature are not in direct contact with each other, but are contacted via an additional feature formed therebetween. Furthermore, a first feature "on," "above," or "on top of" a second feature may include an example in which the first feature is right or obliquely "on," "above," or "on top of" the second feature, or just means that the first feature is at a height higher than that of the second feature; while a first feature "below," "under," or "on bottom of" a second feature may include an example in which the first feature is right or obliquely "below," "under," or "on bottom of" the second feature, or just means that the first feature is at a height lower than that of the second feature.

In the present disclosure, terms such as "an embodiment," "some embodiments," "an example," "a specific example," or "some examples," means that a particular feature, structure, material, or characteristic described in coupling with the embodiment or example is included in at least one embodiment or example of the present disclosure. Thus, the appearances of these terms in various places throughout this specification are not necessarily referring to the same embodiment or example of the present disclosure. Furthermore, the particular features, structures, materials, or characteristics may be combined in any suitable manner in one or more embodiments or examples. In addition, without contradiction, those skilled in the art may combine and unite different embodiments or examples or features of the different embodiments or examples described in this specification.

Although the embodiments of the present disclosure have been illustrated and described above, it can be understood that the above embodiments are exemplary and shall not be understood as limitation to the present disclosure, and changes, modifications, alternatives and variations can be made in the above embodiments within the scope of the present disclosure.

What is claimed is:

1. An earphone box, comprising:

a box body defining an accommodating groove configured to accommodate an earphone, wherein the accommodating groove comprises an interface configured to be electrically coupled to the earphone;

a box magnet mounted on the box body and configured as a multipole magnet, wherein the earphone comprises an earphone magnet with a same number of poles as the box magnet, the box magnet is configured to attract and couple with the earphone magnet, and an attraction coupling face of the box magnet is an inclined face, wherein the accommodating groove comprises a left accommodating groove configured to accommodate a left earphone and a right accommodating groove configured to accommodate a right earphone, the box magnet comprises a first box magnet and a second box magnet arranged in the box body, the first box magnet is configured to attract and couple with the earphone magnet of the left earphone, and the second box magnet is configured to attract and couple with the earphone magnet of the right earphone, wherein the box body comprises a first inclined face constituting at least part of a side wall of the left accommodating groove and a second inclined face constituting at least part of a side wall of the right accommodating groove, the first box magnet is arranged on the first inclined face with an outer surface of the first box magnet being flush with the first inclined face, and the second box magnet is arranged on the second inclined face with an outer surface of the second box magnet being flush with the second inclined face, and wherein the interface comprises a left interface arranged in the left accommodating groove and a right interface arranged in the right accommodating groove, an axis of the left interface is perpendicular to the first inclined face, and an axis of the right interface is perpendicular to the second inclined face.

2. The earphone box according to claim 1, wherein each of the box magnet and the earphone magnet is a two-pole magnet.

3. The earphone box according to claim 1, wherein the left accommodating groove is located at a left portion of the box body, and the right accommodating groove is located at a right portion of the box body, the left accommodating groove and the right accommodating groove are arranged symmetrically in a mirrored manner in a left-right direction.

4. The earphone box according to claim 1, wherein the first box magnet is configured to directly attract and contact the earphone magnet of the left earphone in the left accommodating groove without a barrier layer; and the second box magnet is configured to directly attract and contact the earphone magnet of the right earphone in the right accommodating groove without a barrier layer.

5. The earphone box according to claim 1, wherein the interface is provided with a pogopin having two spring pins, and the box magnet is arranged between the two spring pins of the pogopin.

6. The earphone box according to claim 1, wherein a polarity distribution of an outer surface of the first box magnet is different from a polarity distribution of the outer surface of the second box magnet.

7. The earphone box according to claim 6, wherein poles of the first box magnet are opposite to each other, poles of the second magnet are opposite to each other, and the poles of the first box magnet is opposite to corresponding poles of the second box magnet in position.

8. The earphone box according to claim 6, wherein an upper portion of the outer surface of the first box magnet is N pole and a lower portion of the outer surface of the first box magnet is S pole, an upper portion of the outer surface of the second box magnet is S pole and a lower portion of the outer surface of the second box magnet is N pole.

9. The earphone box according to claim 6, wherein a left portion of the outer surface of the first box magnet is N pole and a right portion of the outer surface of the first box magnet is S pole, a left portion of the outer surface of the second box magnet is S pole and a right portion of the outer surface of the second box magnet is N pole.

10. The earphone box according to claim 1, wherein the interface comprises a left interface arranged in the left accommodating groove and a right interface arranged in the right accommodating groove, and an axis of the left interface and an axis of the right interface are arranged obliquely.

11. The earphone box according to claim 10, wherein an included angle between the axis of each of the left interface and the right interface and a horizontal plane is 45°-55°.

12. The earphone box according to claim 1, wherein the left interface is arranged on the first inclined face and adjacent to the first box magnet, and the right interface is arranged on the second inclined face and adjacent to the second box magnet.

13. The earphone box according to claim 1, wherein each of the first inclined face and the second inclined face is a rough face.

14. The earphone box according to claim 1, wherein the earphone box further comprises a box cover coupled to the box body, the box body further comprises a lower mounting cavity separated from the accommodating groove, the box cover defines an upper mounting cavity, the lower mounting cavity is provided with a Hall sensor, and the upper mounting cavity is provided with a Hall magnet.

15. The earphone box according to claim 14, wherein the upper mounting cavity is provided with a first attraction magnet, the lower mounting cavity is provided with a second attraction magnet, and the second attraction magnet is configured to attract and couple with the first attraction magnet when the box cover closes the accommodating groove.

16. An earphone, comprising:

an earphone body configured as a bud shape, the earphone body being adapted to fit in an accommodating groove of an earphone box, the earphone box comprising:

a box body defining the accommodating groove configured to accommodate the earphone, wherein the accommodating groove comprises an interface configured to be electrically coupled to the earphone;

a box magnet mounted on the box body and configured as a multipole magnet, wherein the earphone comprises an earphone magnet with a same number of poles as the box magnet, the box magnet is configured to attract and couple with the earphone magnet, and an attraction coupling face of the box magnet is an inclined face, wherein the accommodating groove comprises a left accommodating groove configured to accommodate a left earphone and a right accommodating groove configured to accommodate a right earphone, the box magnet comprises a first box magnet and a second box magnet arranged in the box body, the first box magnet is configured to attract and couple with the earphone magnet of the left earphone, and the second box magnet is configured to attract and couple with the earphone magnet of the right earphone, wherein the box body comprises a first inclined face constituting at least part of a side wall of the left accommodating groove and a second inclined face constituting at least part of a side wall of the right accommodating groove, the first box magnet is arranged on the first inclined face with an outer surface of the first box magnet being flush with the first inclined face, and the second box magnet is arranged on the second inclined face with an outer surface of the second box magnet being flush with the second inclined face, and wherein the interface comprises a left interface arranged in the left accommodating groove and a right interface arranged in the right accommodating groove, an axis of the left interface is perpendicular to the first inclined face, and an axis of the right interface is perpendicular to the second inclined face.

17. The earphone according to claim 16, wherein the earphone further comprises a plurality of earphone sleeves of different specifications, each of the plurality of earphone sleeves is adapted to be fitted over the earphone body, and the earphone body fitted with any earphone sleeve is configured to match in an accommodating groove.

* * * * *